United States Patent [19]

Bryant et al.

[11] Patent Number: 5,167,033
[45] Date of Patent: Nov. 24, 1992

[54] CONGESTION CONTROL IN COMPUTER NETWORKS

[76] Inventors: Stewart F. Bryant, 3 Redstone Park, Redhill, Surrey; Michael J. Seaman, 105 McCarthy Way, Finchampstead, Berkshire, both of England

[21] Appl. No.: 545,392

[22] Filed: Jun. 27, 1990

[30] Foreign Application Priority Data

Jun. 29, 1989 [GB] United Kingdom ............... 8914983

[51] Int. Cl.$^5$ .................... H04J 3/16; G06F 11/00
[52] U.S. Cl. .................... 395/575; 364/239.1; 364/239.6; 364/244.3; 364/284.1; 364/939.4; 364/DIG. 1; 364/DIG. 2; 370/85.1; 395/250
[58] Field of Search ............... 364/239.1, 239.6, 244.3, 364/247.3, 284.1, 284.2, 939.4; 395/250, 575; 370/79, 85.1, 85.2

[56] References Cited

U.S. PATENT DOCUMENTS

| | | | |
|---|---|---|---|
| 4,993,015 | 2/1991 | Fite, Jr. | 371/8.2 |
| 5,029,164 | 7/1991 | Goldstein et al. | 370/95.1 |
| 5,048,013 | 9/1991 | Eng et al. | 370/79 |
| 5,051,985 | 9/1991 | Cidon et al. | 370/85.005 |
| 5,067,127 | 11/1991 | Ochiai | 370/58.1 |

*Primary Examiner*—Charles E. Atkinson

[57] ABSTRACT

A known congestion avoidance system for computer networks detects congestion at a node output port if the average queue length (integral) over the last congestion cycle plus the current (incomplete) cycle exceeds a fixed constant (taken as 1). (A congestion cycle is a period for which the queue length is 1 or more plus the following period for which the queue length is 0.) The time of arrival or departure of a message is stored at 21, the interval from the previous event is calculated at 22 and 23, the length of the current cycle is incremented at 25 by adding in the interval just determined, and the queue length at 26 is incremented or decremented by 1. The running integral for the current cycle is updated by having added into it the product formed at 27 of the interval since the last event (stored at 23) and the current queue length. The integrals for the current and previous cycles (stored at 24 and 30) are added and the lengths of those two cycles (stored at 29 and 31) are added, and the first sum divided at 34 by the second to obtain a grand average queue length. If that exceeds a preset value, then a congestion bit is set in messages leaving that node output port.

In the present system, the running queue length average (in 29') is maintained by adding (at 28') the queue length (in 26') into the average at regular intervals determined by timer ticks (from 60) (thus using integer addition instead of integer multiplication), and the grand average compared with the preset value by comparing (at 61) the total of the queue length averages with the total of the cycle periods (thus using integer addition and comparison instead of floating point operation).

7 Claims, 5 Drawing Sheets

CONGESTION CONTROL IN COMPUTER NETWORKS

This invention is concerned with computer networks, and more specifically with controlling congestion in such networks.

A computer network, in the present sense, is a network of message forwarding stations (nodes) by means of which various message originating and receiving stations (commonly termed host computers or just hosts) are interconnected. Messages are originated and received by the hosts; the role of the network is to route the messages between the hosts. A node is generally connected to several others. Each node has an input buffer for each host and each other node it is connected to, and means for inspecting each incoming message, to determine to which node or host it should forward the message.

It is evident that there will be various messages (or, often, streams of messages) passing through the network between the various hosts. If several message streams through the network happen to get routed through the same link from one node to another, that link will be unable to carry all the messages. The node where the various messages converge—or, more specifically, its output port to the link concerned—will thus become congested. That is, the number of incoming messages will be greater than the number of outgoing ones. The node will have internal storage means in which the excess of messages can be stored in a queue, but the size of the queue will be increasing.

When congestion occurs (for whatever reason), it is desirable to take some sort of corrective action. This may involve informing nearby nodes of the congestion, so that the routing of messages is adjusted by the network as a whole to reduce the loading of the congested link. Alternatively, it may involve informing the hosts so that those concerned will reduce the number of messages they are sending.

It is easy to inform the nodes and/or hosts downstream of the congested node of the occurrence of congestion. A bit in the message headers can be reserved as a congestion indicator, being set when the message passes through a congested node. This, of course, does not achieve rapid response, because the congestion must be relieved by reducing the rate at which messages are being sent from the nodes and/or hosts upstream of the congested node. It relies on the probability that messages are going in both directions between the two hosts, so that the host receiving messages with their congestion bits set will include, in the returning messages, instructions to the first host to reduce the message rate. (The return messages may be simple acknowledgement messages.) It has been found that this system works tolerably well.

Congestion control schemes are designed to detect the point at which the system performance starts to decrease and to reduce the system loading when that happens. The performance is usually measured as system throughput; congestion control (or recovery) action is taken when the message throughput of the system starts to fall off.

A different approach has been proposed in a paper DEC-TR-506, "Congestion Avoidance in Computer Networks with a Connectionless Network Layer", by Rai Jain, K K Ramakrishnan, and Dah-Ming Chiu, released by Digital Equipment Corporation in August 1987. In that scheme, the measure of performance is the system delay; congestion avoidance action is taken when the message time through the system starts to increase.

It is found that the message throughput of a system subjected to congestion avoidance is not substantially less than that in a system subjected to conventional congestion control, while the message delays are very substantially less with congestion avoidance. Conventional congestion control generally tries to avoid overflow of the message queues in the node buffers, and comes into operation as the queue size approaches the buffer capacity; congestion avoidance, in contrast, generally tries to avoid queues, and operates to keep the average queue size small. A system subjected to congestion avoidance can, of course, also have a conventional congestion control scheme applied to it, so that it can recover if unusual conditions result in such high message density that the message throughput drops.

With either approach, congestion detection need not be provided at all nodes. If there are nodes which are liable to become congested but which lack congestion detection, however, the system performance is obviously likely to suffer.

The present invention is primarily concerned with the congestion avoidance system, and more specifically with the details of how congestion is detected at a node. The size of the message queue for an output port of the node is known, and congestion is determined from this. But this queue size is not in itself suitable as an indication of congestion, because it is subject to random fluctuations. Some form of smoothing or averaging is therefore desirable.

There is a well-known form of smoothing, exponential smoothing, in which the recent history of the variable being monitored is given a relatively high weight, and the weights given to older samples are progressively reduced. This has the advantage that it is easy to implement. However, it has disadvantages in the present context; for example, the decay time is not responsive to the size of the network, and the effects of a period of high congestion persist (albeit decreasingly) for longer than appropriate.

In the congestion avoidance system described in the paper noted above, congestion occurs in cycles, a congestion cycle being defined as a period for which the queue length remains at 1 or above plus the following period for which the queue length is 0 (i.e. a busy period plus the following idle period). The system requires the average queue length (for a given node, and for a given output link from that node) over the last (full) cycle plus the current (incomplete) cycle to be determined. If this average exceeds a fixed constant (taken as 1), congestion is regarded as occurring, and the congestion bit is set in all the messages passing through that link of the node.

The host which eventually receives the messages notes that the congestion bit in them is set, and includes signals indicating this fact in the messages it sends back to the source host. The source host accordingly reduces the rate at which it sends messages. This reduced rate of sending results, in due course, in a reduction in the rate at which messages flow to the congested node falling. The time delay for this feedback matches the length of a cycle. Thus the use of the last full cycle plus the current cycle for measuring congestion at a node automatically matches the feedback time to the network size.

The effects of any earlier congestion cycles are no longer relevant, and are fully extinguished.

In this known system, the averaging over the congestion cycle is achieved broadly as follows. The running length (period) and the running integral or average queue length for the current cycle are maintained. Also, the total length and average queue length of the last full cycle are stored. On each event—arrival or departure of a message—the time of the event is stored, and the interval from the previous event is calculated (by subtracting the time stored for the previous event from the current time). The length of the current cycle is incremented by adding in the interval just determined, and the queue length is incremented or decremented by 1.

Provided that the system (the node port) is inside a cycle, the running integral for the current cycle is updated by multiplying the interval since the last event by the current queue length, and adding the product into the running integral. A grand average queue length is then calculated, as the sum of the integrals for the current and previous cycles divided by the sum of the lengths of those two cycles. If that grand average is greater than a predetermined constant, then the congestion bit is set in all outgoing messages from the node on the link concerned, until the grand average falls below that constant. The constant is preferably 1.

If the cycle is ending, then the queue length will fall to 0. If this happens, then the step of updating the integral is preferably omitted (because the updating would merely involve adding 0 to the integral). The next event is necessarily an arrival, which starts a new cycle. On this, the current cycle length and integral are stored as the old cycle length and integral (so erasing the values for the previous old cycle), and the current cycle length and integral values are reset to 0 to start the new cycle.

The implementation of this system has significant drawbacks. On every event, the updating of the integral requires a full integer multiplication of the interval and the queue length, and a full floating point division (of the sum of the current and previous integrals by the sum of the previous and current cycle periods). This involves a heavy overhead in time and apparatus for each port of every node.

The main object of the present invention is to provide improved congestion monitoring means for the node ports, which achieve a broadly similar funtionality as far as the operation of the system (network plus hosts) is concerned but is substantially simpler to implement.

Accordingly, the present invention provides congestion monitoring means for a port of a node in a computer network, comprising means for determining, for the current congestion cycle, a running cycle length and a running queue length average (the queue length being the number of messages stored in the node awaiting transmission through that port and a congestion cycle being a period between two successive changes of queue length from 0), and means for determining the grand average of queue lengths to queue periods, characterized by timer means generating pulses at regular intervals, and adding means for adding the queue length to the queue length average at the timer intervals to maintain the running queue length average.

By this means, the maintenance of the running queue length average is achieved by an integer addition, in place of the integer multiplication of the known system. Although the present system does not give precisely the same results as the known system, the differences between the two systems are generally small; and, as will be seen later, minor modifications may be made to the present system to improve its performance.

Preferably means are provided for storing the cycle length and queue length average for at least one previous cycle. Various minor modifications (discussed later) may be made to reduce the number of registers required and/or their arrangement.

Preferably also the means for determining the grand average comprise means for comparing the total of the queue length averages with the total of the cycle periods. By this means, the determination of the grand average is achieved by means of integer additions and a comparison, in place of the floating point operation of the known system.

If the predetermined constant (for the grand average queue length at which the congestion bit is set in outgoing messages) which determines whether or not the congestion bit should be set is 1, then the comparison is a simple comparison of the total of queue length averages with the total of cycle periods. It may however be desirable to treat this as a parameter rather than a constant. In order to retain the feature that the test is a simple comparison, this will mean that the cycle lengths and/or the queue length averages will have to be accumulated with suitable scaling factors. Various convenient techniques for doing this are discussed later.

The present system is quantized by the intervals at which the queue length is added into the running queue length average. If these intervals are long, then this quantization can result in inaccuracies. Two techniques for reducing these (timer period net arrivals counting, and immediate arrival and departure adjustment) are discussed later.

An embodiment of the invention and various modifications thereof will now be described, by way of example, with reference to the drawings, in which.

COMPUTER NETWORK

Figure 1:
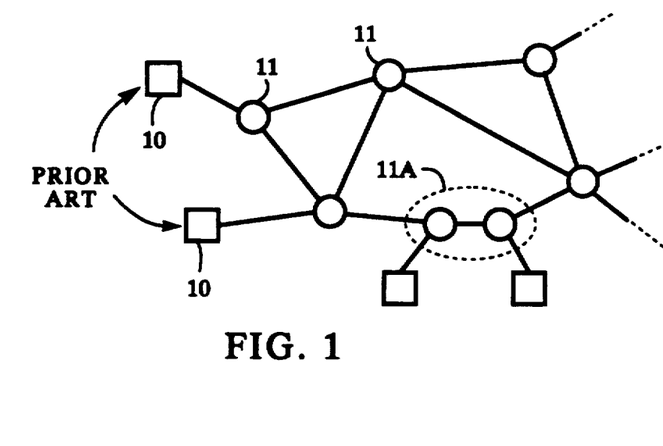
FIG. 1 is a partial block diagram of a computer network.

FIG. 1 shows a computer network comprising a number of hosts 10 interconnected by means of a network of nodes 11. Each host is connected to a node, and the various nodes are interconnected as shown. Each of the various hosts is capable of originating messages which are to be transmitted through the network to some other host. Each such message includes a header which includes various items of control information, including the identity of the host to which it is being sent. Each node of the network includes sufficient information about the geography of the network to be able to direct messages arriving at it towards the hosts identified in the message headers. The precise details of the routing mechanism are not relevant for present purposes; for example, the message routes may be fixed or variable.

The nodes will generally be at geographically separated locations. (The same applies to the hosts.) However, it is possible for two or more nodes to be logically distinct but located at the same location, and even utilizing a single unitary assemblage of hardware, as indicated at 11A.

NETWORK NODE

Figure 2:
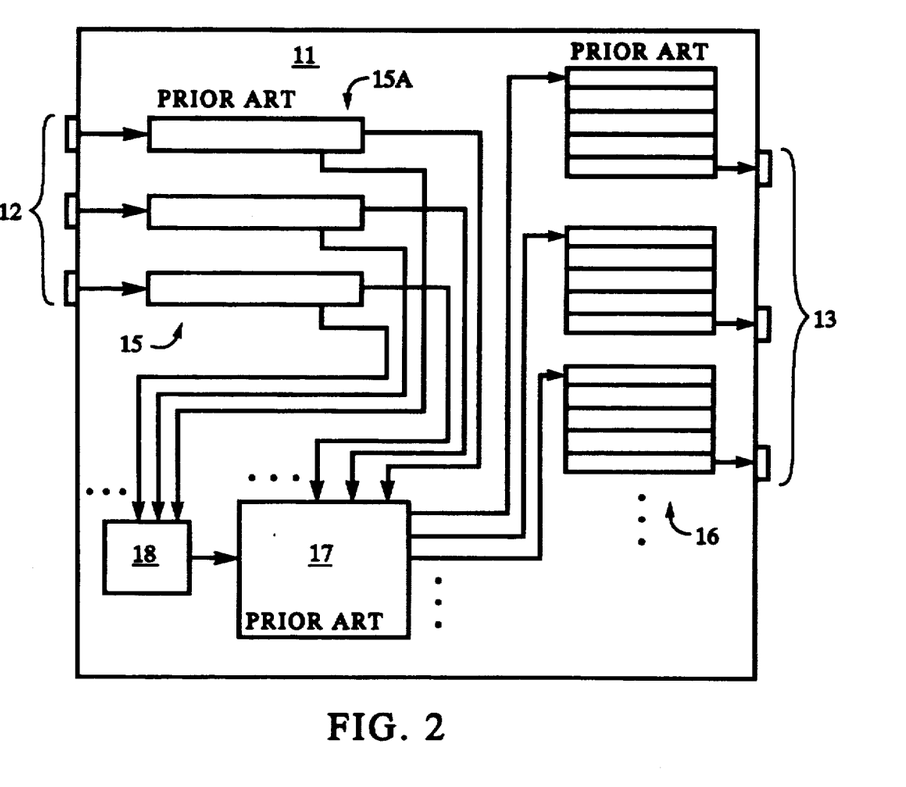
FIG. 2 is a simplified block diagram of a node of the network.

Referring to FIG. 2, a node has a number of input ports 12 and a number of output ports 13. Usually, but not necessarily, the ports are paired, so that each link of the network (to another node or to a host) is bidirectional. Each input port has an associated input buffer 15, capable of storing a single message. Each output port has an associated output queue buffer 16, capable of storing several messages which are to be sent via that port. Each output queue is of the "fall-through" type; that is, a message fed into the top of the output queue falls down through the queue until it reaches any messages already in the queue, so that the messages form a continuous block at the bottom of the queue. The input buffers 15 are coupled to the output queues 16 through switching means 17.

The node also includes control circuitry 18 which monitors the headers of incoming messages in the header portions 15A of the input buffers 15, determining from the destination host identification in the headers to which of the output queues the messages are to be passed, and controls the switching means 17 accordingly. The control circuitry 18 is also coupled to the output ports 13, so that it monitors the number of messages stored in each of the output queues 16 (by counting the messages as they enter and leave the node). It also performs a number of other functions, as will become apparent.

It will be realized that although the input buffers 15 and output queues 16 are logically distinct, they may be physically accommodated in a single common memory, different areas of which are assigned to the different functions by the control circuitry 18. This allows the message lengths and queue lengths to vary as desired, subject to the constraint that the total length of all messages stored must not exceed the total memory capacity. It is also assumed that the switching means 17 and the control circuitry 18 operate rapidly enough that a message in an input buffer 15 is always passed to the appropriate output queue before the next incoming message starts to arrive. (This condition is more easily met if the buffers and output queues consist of designated areas of a common memory, as the transfer of a message from a buffer to an output queue is then achieved by merely changing the designation of the memory area occupied by the message.)

PRIOR ART CONGESTION MONITORING

Circuitry

Figure 3A:
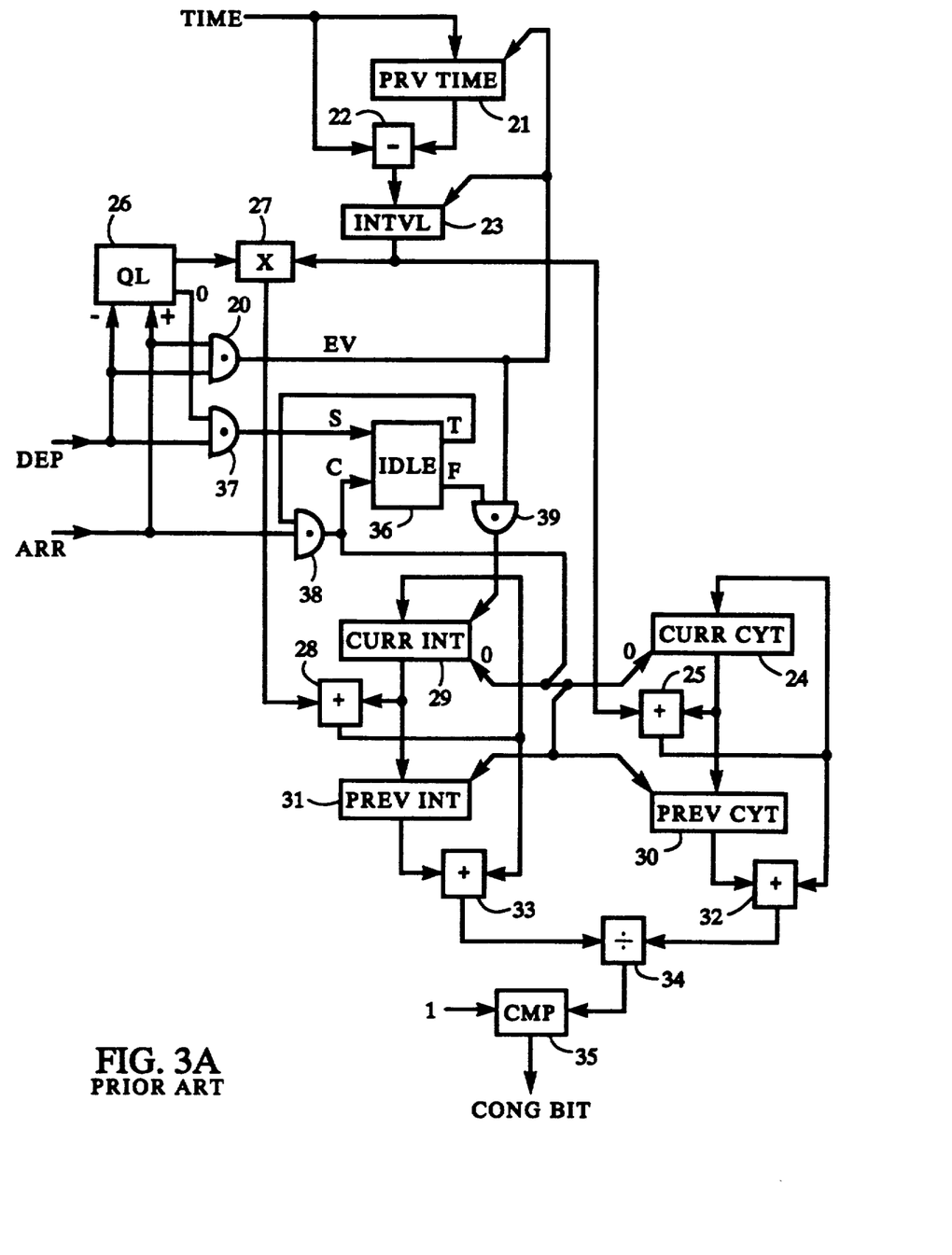
FIG. 3A is a simplified block diagram of part of FIG. 2, showing known control circuitry for congestion monitoring.

FIG. 3A is a block diagram of the logical organization of part of the control circuitry 18 of the known system. This block diagram shows the congestion monitoring functions of the control circuitry relating to a single output port. It is in simplified and diagrammatic form; in particular, it will become apparent that many features relating to timing considerations have not been illustrated.

The circuitry is responsive to an event, which may be either the departure of a message from the particular output port 13 with which the circuitry shown is associated or the arrival, at any of the input ports 12, of a message for that particular output port. These events are indicated by logical signals on two lines DEP and ARR respectively; these two lines feed an OR gate 20, which produces a logical signal EV representing an event of either type.

An integer time signal is continuously available on a line TIME; this signal gives the current time (year, month, etc down to microsecond). (The term "integer" will be used for signals which are of integer form, as contrasted with logical and with floating-point (real) signals; the term "integrated" will be used for signals which represent a time integration or—loosely—average. Obviously, lines carrying integer and floating-point signals are multi-bit lines.) This time signal and the contents of a previous event time register PRVTIME 21 are fed to an integer subtractor circuit 22, which produces the difference between the current time and the time stored in the register 21. On an event (signal EV), the output of subtractor 22 is fed into an interval register INTVL 23, the contents of which thus represent the interval between the previous event and the current event. The contents of register 21, which were the time of the previous event, are at the same moment updated by being replaced by the current time.

The contents of the interval register 23 and those of a current cycle length register CURRCYT 24 are fed to an integer adder 25, which feeds back into the register 24. On an event (signal EV), the current cycle length is thus updated to become its previous value plus the length of the interval between the previous and current events.

A queue length counter QL 26 holds the length of the queue in the ouput queue 16 for the port; an arrival (signal ARR) increments the count by 1, a departure (signal DEP) decrements the count by 1. The queue length is fed to an integer multiplier 27 which is also fed with the interval from register 23 to produce the product of the interval and the queue length. This product is fed to an integer adder 28, which is also fed with the contents of a register CURRINT 29 which contains the current integration, adder 28 feeding this register. On an event (signal EV), the current integration is thus updated to become its previous value plus the product from multiplier 27.

In addition to the current cycle time and current integration registers 24 and 29, there is a previous cycle time register PREVCYT 30 and a previous cycle integration register PREVINT 31. The two cycle time registers feed an integer adder 32, which thus produces a total cycle time for the previous and current cycles, and the two integration registers feed an integer adder 33, which thus produces a total integration for the previous and current cycles. These two adders 32 and 33 feed a floating-point divider 34, which produces a grand average for the queue length for the previous and current cycles. The divider 34 feeds a floating point comparator CMP 35, which determines whether the grand average exceeds 1; if it does, then the output on line CONGBIT is true. This output is passed to the output port, to set true the congestion bit in the header of the next message to be transmitted.

The start and finish of a cycle is determined by the count in the queue length counter and the state of an idle flip-flop IDLE 36, which is normally in the clear (false) state. It is set by the combination of a departure and the queue length counter being decremented to 0 by that departure. This combination is detected by an AND gate 37, which feeds the set input of the flip-flop.

It is cleared by the next occurrence of an arrival; this is detected by an AND gate 38, which feeds the clear input of the flip-flop. This flip-flop controls the updating the previous cycle time and integration registers 30 and 31 from the current cycle time and integration registers 24 and 29; this updating occurs when the signal from gate 38, which clears the idle flip-flop, goes true. This same signal also clears the contents of the current cycle time and integration registers 24 and 29 to 0 for the start of the next cycle. In addition, the updating of the current integration register 29 is in fact controlled not simply by the event signal EV, but by the combination of this signal and the output of the 0 side of the idle flip-flop 36, generated by an AND gate 39. This inhibits the updating of the current integration register 29 on the first event of a new cycle; since the queue length at that time is 0, the product from multiplier 27 will be 0, so it is not necessary to add that into the integration register 29.

Flow diagram

Figure 3B:
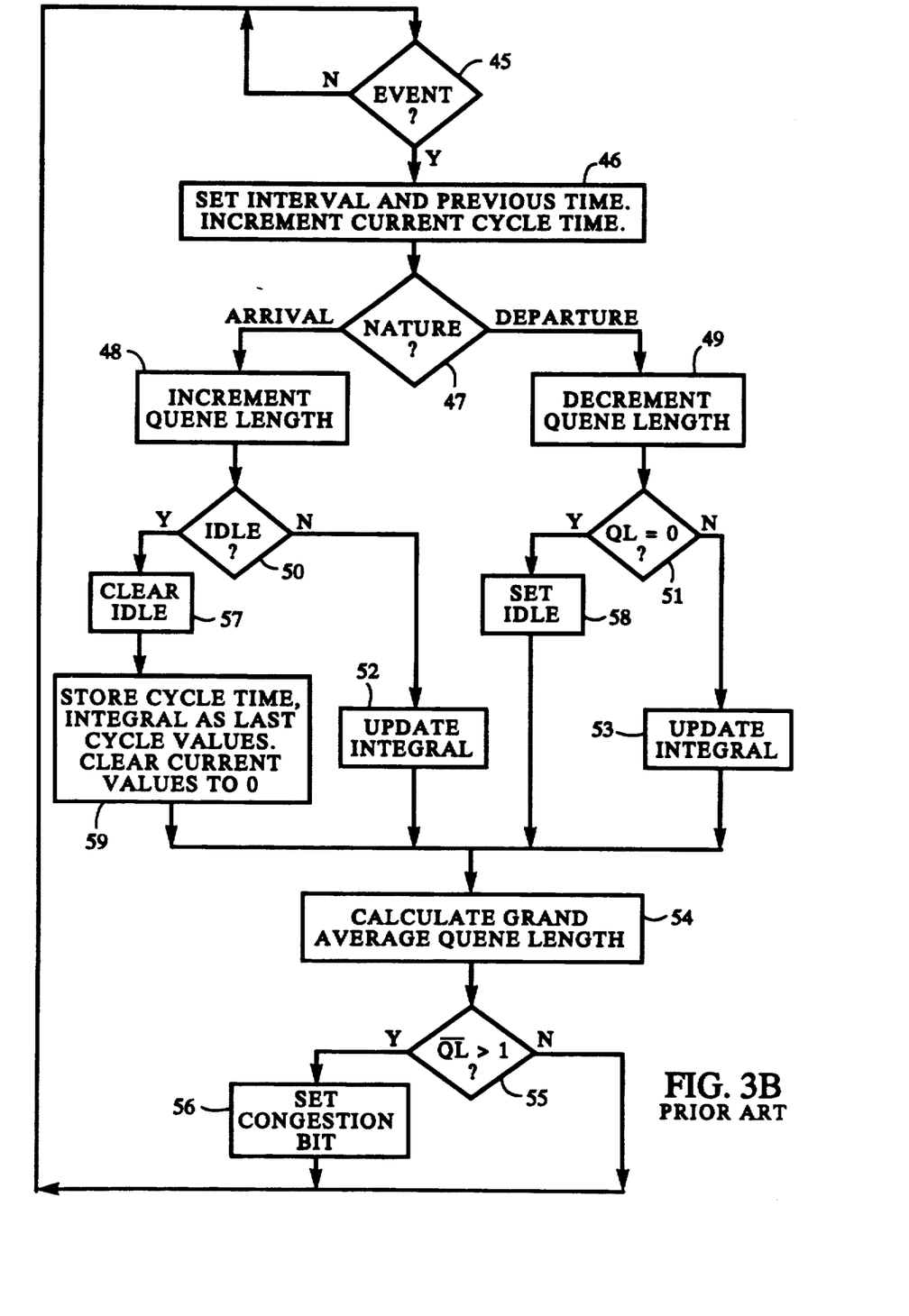
FIG. 3B is a flow diagram corresponding to the circuit of FIG. 3A.

FIG. 3B is a simplified flow diagram of the operation of this circuitry. The circuitry remains in the waiting loop around block 45 until an event occurs. On that, the interval register 23 and the previous time register 21 are updated, and the current cycle time register 24 is updated (block 46). The queue length register 26 is then incremented or decremented (block 48 or 49) depending on whether the event was an arrival or departure (as determined in block 47). If the system is not at a change of cycle, as determined in block 50 or 51, the current integration register 29 is then updated (block 52 or 53). The grand average queue length is then calculated in block 54 (adders 32 and 33 and divider 34), and the result compared with the predetermined constant of 1 in block 55; if the result exceeds 1, the congestion bit is set in the next message to be sent (block 56). The system then returns to the waiting state (block 45).

If the system is at a change of cycle and the event is a departure, block 51 is followed by block 58, the setting of the idle flip-flop 36, which is followed immediately by block 54. If the system is at a change of cycle and the event is an arrival, block 50 is followed by blocks 57, the clearing of the idle flip-flop 36, and 59, the updating of the previous cycle time and integration registers 30 and 31 and the clearing to 0 of the current cycle time and integration registers 24 and 29, which is followed immediately by block 54.

It will be realized that while the various registers of this circuitry must be provided separately for each output port 13, it is possible for a single set of arithmetic circuits (adders, multipliers, etc) to be provided, time-shared between the different output ports. This of course requires the arithmetic circuits to operate fast enough to perform the required arithmetic for all the ports. Also, means must be provided for ensuring that the timing of the various operations of the circuitry for the different ports is appropriately interleaved.

PRESENT CONGESTION MONITORING

Circuitry

Figure 4A:
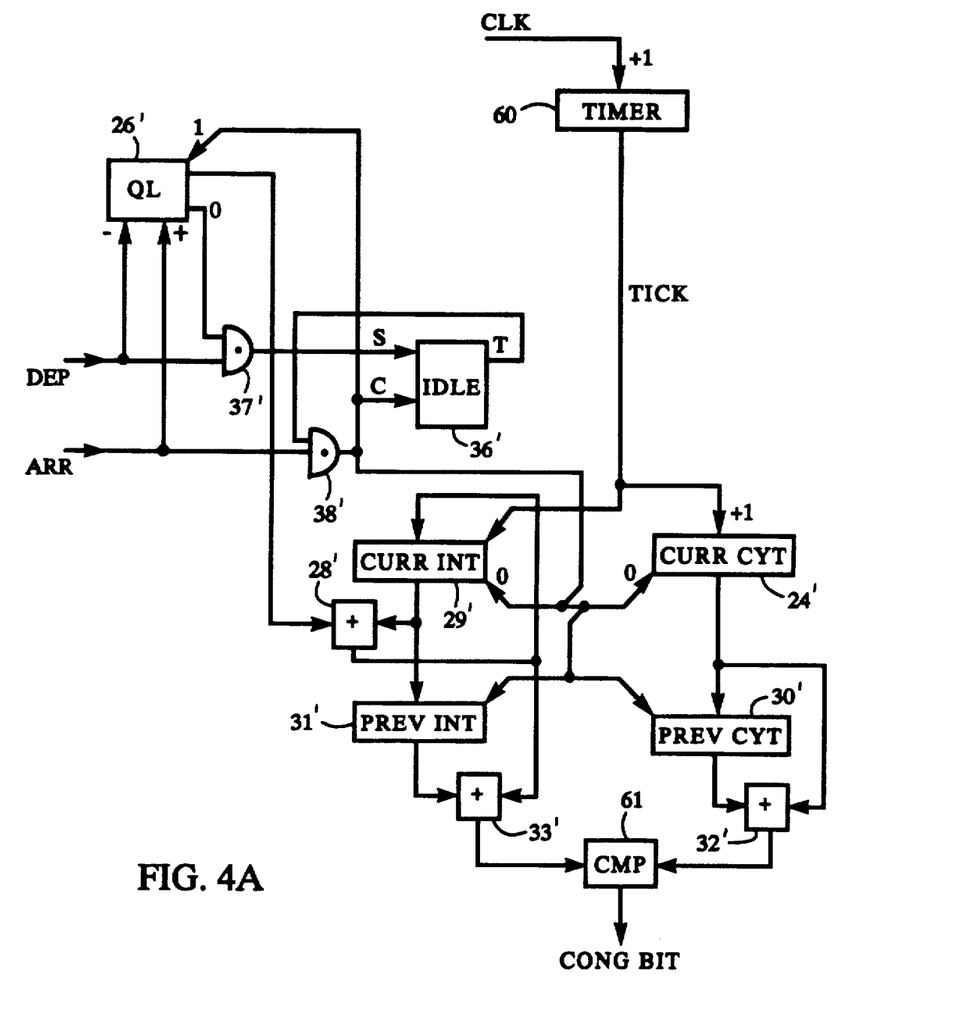
FIG. 4A is a simplified block diagram of a basic form of the present control circuitry for congestion monitoring.

FIG. 4A is a block diagram of part of the control circuitry 18 incorporating a basic form of the present invention. The circuitry corresponds to some extent to that of FIG. 3A, and is referenced and laid out accordingly.

The circuitry is responsive to an event, which may be either the departure of a message from the particular output port with which the circuitry shown is associated or the arrival, at any of the input ports, of a message for that particular output port. The circuitry also includes a free-running timer to which the rest of the circuitry is responsive, so that updating occurs at regular intervals.

A clock signal CLK running at high frequency (e.g. a small multiple of the bit frequency in the messages) is fed to a timer 60 which operates as a cyclic counter, generating timer tick pulses TICK at regular intervals. The period of the TICK pulses should be at least sufficient to allow time division of the associated updating of the circuitry associated with each output port. The TICK pulses are fed to a current cycle length register 24', which operates as a counter counting the TICK pulses.

A queue length counter 26' holds the length of the queue in the output queue for the port; an arrival (signal ARR) increments the count by 1, a departure (signal DEP) decrements the count by 1. The queue length is fed to an integer adder 28', which is also fed with the contents of a register 29' which contains the current integration, adder 28' feeding this register. On a timer tick, the current integration is thus updated to become its previous value plus the length of the queue at the end of the timer period.

In addition to the current cycle time and current integration registers 24' and 29', there is a previous cycle time register 30' and a previous cycle integration register 31'. The two cycle time registers feed an integer adder 32', which thus produces a total cycle time for the previous and current cycles, and the two integration registers feed an integer adder 33', which thus produces a total integration for the previous and current cycles. These two adders 32' and 33' feed an integer comparator 61, which determines whether the total integration value exceeds the total time; if it does, then the output CONGBIT is true. This output is passed to the output port, to set true the congestion bit in the header of the message which is just about to depart.

The start and finish of a cycle is determined by the count in the queue length counter and the state of an idle flip-flop 36' IDLE, which is normally in the clear (false) state. It is set by the combination of a departure and the queue length counter being decremented to 0 by that departure. This combination is detected by an AND gate 37', which feeds the set input of the flip-flop. It is cleared by the next occurrence of an arrival; this is detected by an AND gate 38', which feeds the clear input of the flip-flop. This flip-flop controls the updating the previous cycle time and integration registers 30' and 31' from the current cycle time and integration registers 24' and 29'; this updating occurs when the signal from gate 38', which clears the idle flip-flop, goes true. This same signal also clears the contents of the current cycle time and integration registers 24' and 29' to 0 for the start of the next cycle, and clears the next cycle, and clears the queue length counter 20' to 0, inhibiting the normal incrementing by the signal ARR.

Flow diagram

Figure 4B:
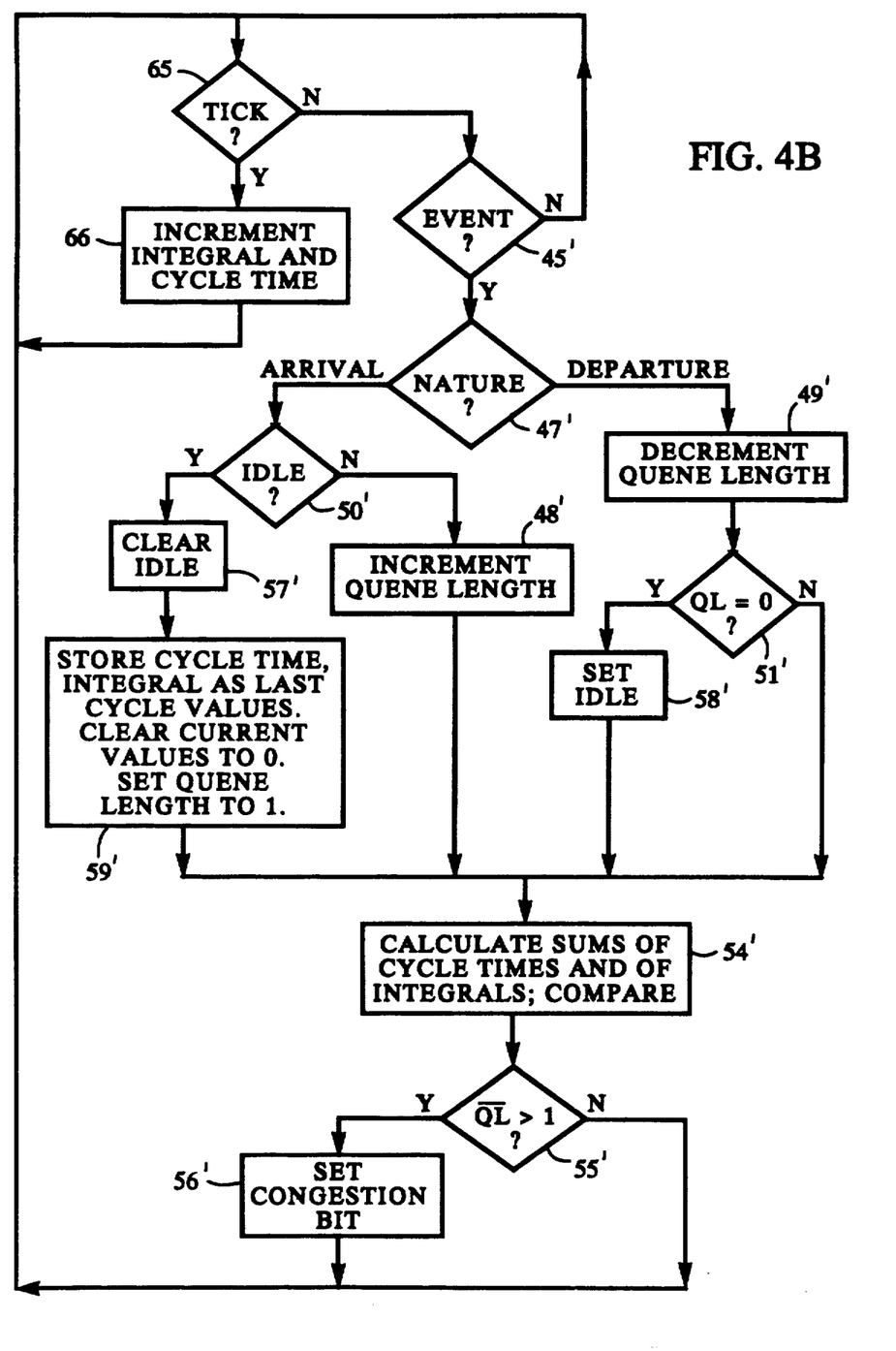
FIG. 4B is a flow diagram corresponding to the circuit of FIG. 4A.

FIG. 4B is a simplified flow diagram of the operation of this circuitry. The circuitry remains in the waiting loop around blocks 65 and 45' until a timer tick or an event occurs. On a timer tick, the current cycle time register 24' is incremented, and the current integral register 29' is updated by having the current queue length added into it (block 66). On an event when the system is not at a change of cycle, the queue length register 26' is incremented or decremented (block 48' or 49') depending on whether the event was an arrival or departure (as determined in block 47'). The grand total of the integrations and the grand total of the cycle lengths are then calculated in block 54' (adders 32' and 33'). The congestion bit is to be set if their ratio, $\overline{QL}$, is greater than 1. This is achieved by comparator 61 comparing these two grand totals (block 55'); if the former is greater than the latter, the congestion bit is set in the message which is about to depart (block 56'). The system then returns to the waiting state (blocks 45' and 65').

If the system is at a change of cycle and the event is a departure, block 51' is followed by block 58', the setting of the idle flip-flop 36', which is followed immediately by block 54'. If the system is at a change of cycle and the event is an arrival, block 50' is followed by block 57', the clearing of the idle flip-flop. This is followed by block 59'; the updating of the previous cycle time and integration registers 30' and 31', the clearing to 0 of the current cycle time and integration registers 24' and 29', and the setting of the queue length register 26' to 0. This is then followed by block 54.

The signal on line CONGBIT is set to 1 if the combined integral from adder 33' is greater than the combined time from adder 32', and to 0 if the output of adder 33' is less than that from adder 32'. The comparator should also give a 0 output if the two adder outputs are equal. This is because on initialization, both adder outputs are zero, and it is preferable to assume that there is no congestion in this state.

The question of what happens in general if the contents of a register reach the maximum which the register can hold has not yet been considered explicitly. For the timer register 60, it was noted above that this register should be cyclic; thus its contents will return to 0 from their maximum value. But in general, a register should be non-cyclic, so that its contents will stick at the maximum instead of cycling to 0. Similarly, the contents of a register should in general stick at 0 instead of cycling to the maximum when they are being decremented.

Comparison with prior art

It will be realized that this circuitry incorporates two major changes from that of FIGS. 3A and 3B.

The first change is that the integration of the prior system has been replaced by a somewhat smoothed integration. In the prior system, the integration is updated on each event. This requires the integer multiplication of the (variable) interval between the previous and current events by the queue length. In the present system, integration is performed not on events but on timer ticks. The "interval" is therefore the same for every updating. No multiplication is necessary, because the cycle length is measured in timer tick periods, so the length of a timer tick period is 1. All that is required is the addition of the queue length into the integration on each timer tick.

The second change is that the grand average queue length is no longer calculated as such, so the floating point division and comparison are no longer required. The grand average is the total integration divided by the total time, and this is compared to 1. This is equivalent to simply comparing the total integration to the total time, and that is what is done in the present system.

The two operations involving major operating time and complexity—multiplications and floating point operations—are therefore both eliminated by the present system.

Modifications and developments

The present system as so far described can be modified and developed in a number of respects, to improve its performance in various ways.

Modifying the registers

Taking the current (partial) and previous (full) cycle times as Tc and Tp, and the corresponding integrals as Ic and Ip, the prior art circuitry operated by evaluating (Ic+Ip)/(Tc+Tp) and comparing the result to 1. The present system as described above operates by evaluating the two sums (Ic+Ip) and (Tc+Tp) separately and comparing them. This is equivalent to evaluating (Ic+Ip−Tc−Tp) and determining its sign. Since the values for the previous cycle are fixed, the difference (Ip−Tp) can be calculated at the start of a cycle and stored in a single register (in place of the two registers 30' and 31').

Further, the difference (Ic−Tc) can be used instead of the two separate values Ic and Tc, being stored in a single register in place of the two registers 24' and 29'. This requires two changes to the difference (Ic−Tc) on each timer tick; the difference must be incremented by the queue length and also decremented by 1. This can be achieved in various ways. For example, a decrement-by-1 circuit can be included in the feedback path from the adder 28' back to the register storing the difference (Ic−Tc); or the queue length counter can be arranged so that the value which it stores is always 1 less than the true queue length.

Analogously, the expression (Ic+Ip−Tc−Tp) can be stored as a single quantity, being incremented by the queue size and decremented by 1 on each timer tick. The congestion bit is set if this quantity is greater than 0. It is still necessary to maintain the quantity (Ic−Tc) as well, since this has to be known at the end of the cycle, when it becomes (Ip−Tp). Storing the differences (Ic−Tc) and (Ic+Ip−Tc−Tp) as single quantities has the advantage that the bounds control of these quantities is easier.

It may be noted that the time for which the queue length is 0 is treated as a part of the current cycle. As soon as the queue length rises above 0, a new cycle begins, and the difference (Ic−Tc) is transferred to become the difference (Ip−Tp) for the cycle which has just ended, that cycle having just become the (new) previous cycle. If the queue length remains at 0 for a considerable time, then the difference (Ic−Tc) is reduced by 1 on every timer tick. Thus this difference is slowly "aged out". This means that when a new cycle begins, the effect of the previous cycle is decreased in dependence on how long ago that previous cycle was "active". In general terms, it does not matter how big the queue became in the previous cycle provided that there has been a long enough interval at its end with a queue length of 0.

Timer tick period length

The choice of the length of the timer period is affected by a variety of factors. The natural unit for measuring the timer period is the time required for a single message transmission (that is, the inverse of the maximum message rate). The timer period quantizes the measurement of the current and previous cycle times by the registers 24' and 30'. If the timer period is short compared to this natural time, then this quantization will not affect the accuracy of the system appreciably. However, if the timer period is long, then the quantization may cause inaccuracy. The effect of this can be reduced by two techniques: timer period net arrivals counting, and immediate arrival and departure adjustment.

If the timer interval is a very large multiple of (e.g. 20 times) the time required for a single message transmission, then the integration can be significantly inaccurate if there is a high message rate. If the queue length falls to zero during a timer period, then the current cycle is terminated, but if it rises markedly and then falls again, this fact is not detected. Thus the integral as determined by the system is somewhat biassed downwards. To counteract this, an arrival counter can be added. This counter will be arranged to count the number of arrivals during a timer period, with its count being added into the current cycle integral at the end of the timer period tick and the counter being reset to zero at the same time.

The degree of such counteraction can be reduced by e.g. adding in only half the contents of the arrival counter; that is, by dropping its lowest order bit. If the full counteraction is required, the counter is not required; instead, the integral can be incremented by 1 on each arrival. Similarly, if 50% counteraction is required, this can be achieved by using a flip-flop instead of the counter, the flip-flop changing state on each arrival and the integral being incremented only when the flip-flop is set.

The "liveliness" of the system can be improved by the technique of immediate arrival and departure counting. The expressions which generate Ic are increased on each arrival and decreased on each departure. The congestion bit is set if $(Ic+Ip-Tc-Tp)>1$. The constant 1 is required because a single arrival after a long quiet interval would cause the congestion bit to be immediately set to 1, giving the appearance of permanent congestion. The necessary adjustment is equivalent to accounting for Tc for the arrived message at the beginning of the timer period instead of the end.

Generalized average queue length criterion

As described so far, the effect of the system is to set the congestion bit if the grand average of the queue length (over the previous and current cycles) is greater than 1. It may be desirable to use a predetermined critical value qt rather different to 1.

The present system, as so far described, effectively determines whether the grand average is greater than 1; that is, whether $iql/tct>1$ (where iql is the integrated queue length for the previous and current cycles, and tct is the total cycle time for the previous and curent cycles). In this form, a division is required; however, in the present system, this inequality is implemented in the form $iql>tct$, which involves only additions and a comparison (subtraction). Replacing the constant 1 by a parameter qt changes the basic inequality to $iql/tct>qt$. This can be converted to the forms $iql>qt.ict$, or $iql-qt.tct>0$. In general this involves a floating point multiplication, which is undesirable. It is therefore preferred to take qt as a rational fraction qtn/qtd, and convert the inequality to $qtd.iql>qtn.tct$, which involves only integer multiplications.

To implement this, the constants in the rates at which the integral and current time are incremented have to be changed. The current cycle time has to be incremented by qtn rather than 1 on each timer tick; this can be achieved by providing a loop from the current cycle time register 24' back to itself and containing an adder, or by providing a pulse generator which feeds a plurality of pulses into the current cycle time register on each tick. The increment can also be made "programmable" by providing a rate register the contents of which are set to a desired value initially and added into the current cycle time on each timer tick. Changing the constant for the current integral is slightly more complicated, but can be achieved by adding the queue length into it qtd times instead of once. This can be done serially, or it can be done in parallel by feeding the queue length to more than one input of a multi-input adder, with appropriate shifting.

Factors of 2 can of course readily be introduced by appropriate shifting of the outputs of the registers, rather than by multiple additions into them. It may therefore be desirable to choose qtd to be a power of 2 and shift the register outputs appropriately.

If immediate arrival and departure adjustment is implemented, it is necessary to compare $iql-qt.tct$ with qt rather than 0, for the reasons previously discussed.

Variations of implementation

It is not necessary for blocks 54' to 56' to be performed if the event is an arrival. Whether it is better to perform these blocks on all events or to change the system slightly so that these blocks are only performed on departure events depends on the particular implementation chosen. If the implementation results in the process described above taking a substantial time compared with the time taken to transmit the message, then it may be desirable to modify the process slightly so that the signal CONGBIT is saved and used to set the congestion bit in the next message (if that message is a departure rather than an arrival). If this is done, then blocks 54' to 56' must obviously be performed on every event. (The same considerations apply to the known system of FIGS. 3A and 3B).

It will of course be realized that the various registers of this circuitry may be physically accommodated in a single common memory, being selected by conventional means. Also, the various registers for the different ports may similarly be accommodated in the same single common memory; or a set of memories may be provided, each accommodating corresponding registers one for each port. Also, the various fuctions performed on these registers may be performed by means of a single arithmetic and logic unit, which is caused to perform the different functions in known manner.

We claim:

1. A system for monitoring message congestion at an output port of a node in a network, the system comprising:
   A. message transmission means associated with the output port for receiving messages for transmission through the output port, the message transmission means holding each message until the message can be transmitted through the output port;
   B. timing means for generating timing pulses;
   C. message counting means for counting messages held by the message transmission means and generating a message queue length count;
   D. cycle counting means for counting the timing pulses and generating a cycle time count where a cycle corresponds to the time period between two successive changes of the message count from zero:
   E. average queue length determining means for updating, in response to a timing pulse, an average queue length count, the average queue length determining means combining a count associated with the message queue length count and the average queue length count to produce an updated version of the average queue length count;

F. average queue length count manipulating means for combining the average queue length count determined by the average queue length count determining means and a stored average queue length count associated with a previous cycle to produce a total average queue length count;

G. average cycle time determining means for combining the cycle time count with a stored cycle time count associated with the previous cycle to produce a total cycle time count;

H. comparison means for comparing the total average queue length count and the total cycle time count;

I. signalling means for asserting a congestion signal if the comparison means determines that the total average queue length count is greater than the total cycle time count;

J. storage means for storing, at the end of a cycle, the average queue length count and the cycle time count; and K. means for reducing the cycle count and the average queue length count to a predetermined value after the storage means has stored the counts.

2. The system of claim 1, wherein the average queue length determining means combines a multiple of the message count with the average queue length count to update the average queue length count.

3. The system of claim 1, wherein the system includes an arrival counter which counts the number of messages received by the message transmission means between timer pulses, the arrival means supplying to the message counter a fraction of the count at each timer pulse, and the message counter updating the message count by the fraction at each timer pulse.

4. The system of claim 1, wherein the message counting means increases the message queue length count for each message received by the message transmission means and decrements the message queue length count for each message transmitted by the message transmission means whenever a message is transmitted or received.

5. A method for monitoring message congestion at an output port of a node in a network, the method comprising the steps of:

A. maintaining a count of messages held by the node for transmission through the output port during a cycle, where a cycle corresponds to a period between two successive changes of the message count from zero;

B. counting timing pulses in a cycle to produce a cycle time count;

C. at each timing pulse
 i. adding to an average queue length sum the count of the messages held by the node;
 ii. adding the cycle time count to a stored cycle time count associated with a preceding cycle to produce a total cycle time count;
 iii. adding the average queue length sum to a stored average queue length sum associated with the preceding cycle to produce a total queue length sum;

D. asserting a congestion signal if the total queue length sum is greater than the total cycle time count;

E. at the end of a cycle, storing the average queue length sum and the total cycle count;

F. reducing the cycle time count and the average queue length to zero; and

G. repeating steps A-F.

6. A method for monitoring message congestion at an output port of a node in a network, the method comprising the steps of:

A. maintaining a message count of messages held by the node for transmission through the output port during a cycle, where a cycle corresponds to a period between two successive changes of the message count from zero;

B. at each timing pulse
 i. adding to an average queue length sum the message count and producing a new average queue length sum,
 ii. decrementing a congestion count by one and incrementing the congestion count by a number associated with the average queue length sum,
 iii. adding the congestion count to a stored congestion count to produce a congestion total, and
 iv. asserting a congestion signal if the congestion total is greater than a predetermined minimum value;

C. at the end of a cycle, storing the congestion count;

D. reducing the congestion count and the average queue length sum to zero; and

E. repeating steps A-D.

7. A system for monitoring message congestion at an output port of a node in a network, the system comprising:

A. message transmission means associated with the output port for receiving messages for transmission through the output port, the message transmission means holding each message until the message can be transmitted through the output port;

B. timing means for generating timing pulses;

C. cycle count means which, in response to a timing pulse generated by the timing means, increments a cycle message queue length count by an amount associated with the number of messages that the message transmission is holding, to produce a cycle count where a cycle corresponds to a period between two successive changes of the message count from zero;

D. an adder for adding the cycle count to a cycle count associated with a preceding cycle;

E. signalling means for asserting a congestion signal, the signalling means asserting the congestion signal if the adder produces a sum which is greater than a predetermined minimum;

F. storage means for storing the cycle count at the end of the cycle; and

G. means for reducing the cycle count to a predetermined value after the storage means has stored the count.

* * * * *